US009877278B2

United States Patent
Sartori et al.

(10) Patent No.: US 9,877,278 B2
(45) Date of Patent: Jan. 23, 2018

(54) MONITORING A NARROWBAND CONTROL CHANNEL FOR A WIDEBAND SYSTEM TO REDUCE POWER CONSUMPTION

(71) Applicant: Futurewei Technologies, Inc., Plano, TX (US)

(72) Inventors: Philippe Sartori, Plainfield, IL (US); Vipul Desai, Palatine, IL (US); Lukasz Krzymien, Rolling Meadows, IL (US); Carmela Cozzo, San Diego, CA (US); Qian Cheng, Aurora, IL (US); Anthony Soong, Plano, TX (US); Jialing Liu, Palatine, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 105 days.

(21) Appl. No.: 15/093,625

(22) Filed: Apr. 7, 2016

(65) Prior Publication Data

US 2016/0302092 A1  Oct. 13, 2016

Related U.S. Application Data

(60) Provisional application No. 62/146,134, filed on Apr. 10, 2015.

(51) Int. Cl.
*H04W 24/08*   (2009.01)
*H04W 52/02*   (2009.01)
(Continued)

(52) U.S. Cl.
CPC ........... *H04W 52/0209* (2013.01); *H04L 5/00* (2013.01); *H04L 5/0044* (2013.01); *H04L 5/0098* (2013.01);
(Continued)

(58) Field of Classification Search
CPC ............ H04W 52/0209; H04W 72/04; H04W 72/0446; H04W 52/0235; H04W 72/1289;
(Continued)

(56) References Cited

U.S. PATENT DOCUMENTS 9,226,289 B2 * 12/2015 Gupta ............... H04W 72/0446
9,326,177 B2 *  4/2016 Liu ....................... H04W 24/10
(Continued)

FOREIGN PATENT DOCUMENTS

CN       104221457 A     12/2014
WO       2014123335 A1    8/2014

OTHER PUBLICATIONS

International Search Report and Written Opinion dated Jul. 1, 2016 in International Patent Application No. PCT/CN2016/078924, 11 pages.

*Primary Examiner* — Brian O'Connor
(74) *Attorney, Agent, or Firm* — Vierra Magen Marcus LLP

(57) ABSTRACT

The disclosure relates to technology for a base station to signal user equipment to monitor a narrowband control channel in a wideband system. The base station sends a configuration signaling to configure the user equipment including a designation of subframe(s). The base station then determines whether to signal the user equipment to monitor the subframe(s) using one of a narrowband bandwidth and a system bandwidth. In response to the base station signaling the user equipment to monitor the narrowband bandwidth, the base station communicates with the user equipment using the narrowband bandwidth. In response to the base station signaling the user equipment to monitor the system bandwidth, the base station sends a probe message within the narrowband bandwidth to the user equipment, where the probe message signals to the user equipment to begin
(Continued)

monitoring the system bandwidth and to communicate with the user equipment using the system bandwidth.

21 Claims, 11 Drawing Sheets

(51) Int. Cl.
  *H04W 72/04* (2009.01)
  *H04L 5/00* (2006.01)
  *H04W 72/12* (2009.01)

(52) U.S. Cl.
  CPC ........ *H04W 52/0235* (2013.01); *H04W 72/04* (2013.01); *H04W 72/0446* (2013.01); *H04W 72/1289* (2013.01); *Y02B 60/50* (2013.01)

(58) Field of Classification Search
  CPC ....... H04L 5/00; H04L 5/0044; H04L 5/0098; Y02B 60/50
  See application file for complete search history.

(56) References Cited

U.S. PATENT DOCUMENTS

| | | | |
|---|---|---|---|
| 9,642,021 B2* | 5/2017 | Siomina | H04W 24/10 |
| 2010/0067418 A1 | 3/2010 | Parkvall et al. | |
| 2013/0201936 A1 | 8/2013 | Chen et al. | |
| 2014/0133333 A1* | 5/2014 | Liu | H04W 24/10 |
| | | | 370/252 |
| 2014/0153417 A1* | 6/2014 | Gupta | H04W 52/0219 |
| | | | 370/252 |
| 2014/0301262 A1 | 10/2014 | Homchaudhuri et al. | |
| 2014/0334366 A1* | 11/2014 | Hsu | H04W 52/0225 |
| | | | 370/311 |
| 2015/0365209 A1* | 12/2015 | Yi | H04L 5/001 |
| | | | 370/329 |
| 2016/0302150 A1* | 10/2016 | Palenius | H04W 52/0216 |
| 2016/0338093 A1* | 11/2016 | Frenne | H04L 5/0053 |

* cited by examiner

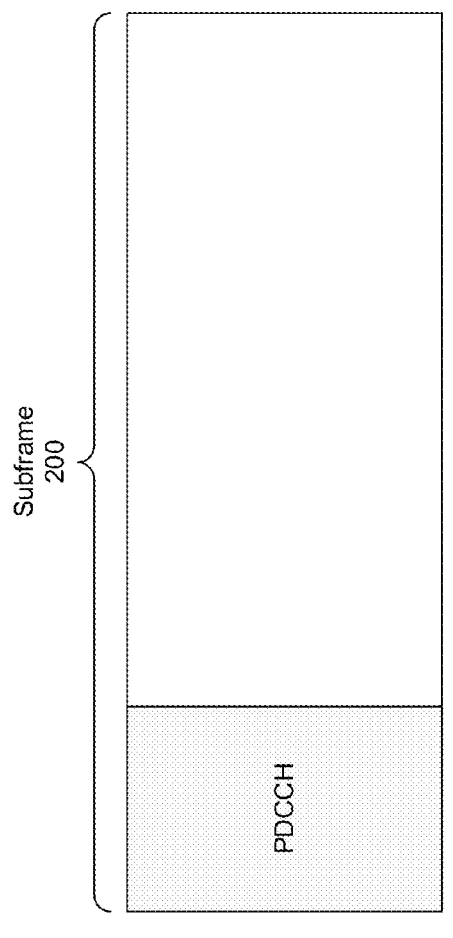 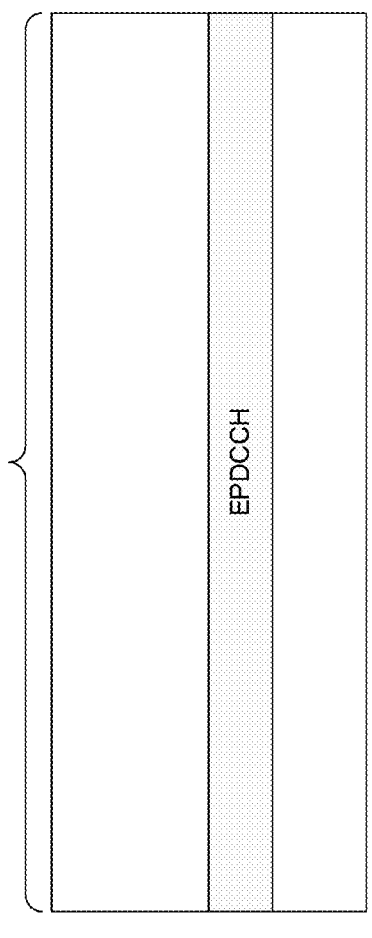
FIG. 2A
FIG. 2B

MONITORING A NARROWBAND CONTROL CHANNEL FOR A WIDEBAND SYSTEM TO REDUCE POWER CONSUMPTION

CLAIM FOR PRIORITY

This application claims the benefit of priority to U.S. Provisional Application 62/146,134, filed Apr. 10, 2015, the contents of which are hereby incorporated by reference.

BACKGROUND

The LTE-A (Long Term Evolution-Advanced) is a further evolved and enhanced system based on a 3GPP LTE (3rd Generation Partnership Project Long Term Evolution) system. In this system, the downlink radio access technique may be Orthogonal Frequency Division Multiplexing (OFDM) or Orthogonal Frequency Division Multiple Access (OFDMA), and the uplink radio access technique will be Single-Carrier FDMA (SC-FDMA) which is a type of a linearly pre-coded OFDMA.

The uplink system band has a structure where a Physical Uplink Control Channel (PUCCH) is used for transferring uplink control messages where there is no uplink user traffic, and a Physical Uplink Shared Channel (PUSCH) is used for transmission of uplink user traffic. Additional control messages may be transmitted in resources initially allocated to the PUSCH. The PUCCH carries uplink control information, such as ACK/NACK messages, channel quality indicators (CQI), scheduling request indicators (SRI), channel rank indicators, downlink pre-coding information, etc.

The downlink system band has a structure where a Physical Downlink Shared Channel (PDSCH) is the primary data bearing channel which is allocated to users dynamically. The PDSCH carries data in transport blocks (TBs), which correspond to a media access control (MAC). The TBs are passed from the MAC layer to the physical (PHY) layer once per transmission time interval (TTI).

BRIEF SUMMARY

In one embodiment, there is a method for a base station to signal user equipment to monitor a narrowband control channel in a wideband system, comprising the base station sending a first configuration signaling to configure the user equipment including a designation of one or more subframes; the base station determining whether to signal the user equipment to monitor the one or more subframes using one of a narrowband bandwidth and a system bandwidth; in response to the base station signaling the user equipment to monitor the narrowband bandwidth, communicating with the user equipment using the narrowband bandwidth; and in response to the base station signaling the user equipment to monitor the system bandwidth, sending a probe message within the narrowband bandwidth to the user equipment, the probe message signaling to the user equipment to begin monitoring the system bandwidth, and communicating with the user equipment using the system bandwidth.

In another embodiment, there is a non-transitory computer-readable medium storing computer instructions for a base station to signal user equipment to monitor a narrowband control channel in a wideband system, that when executed by one or more processors, perform the steps of the base station sending a first configuration signaling to configure the user equipment including a designation of one or more subframes; the base station determining whether to signal the user equipment to monitor the one or more subframes using one of a narrowband bandwidth and a system bandwidth; in response to the base station signaling the user equipment to monitor the narrowband bandwidth, communicating with the user equipment using the narrowband bandwidth; and in response to the base station signaling the user equipment to monitor the system bandwidth, sending a probe message within the narrowband bandwidth to the user equipment, the probe message signaling to the user equipment to begin monitoring the system bandwidth, and communicating with the user equipment using the system bandwidth.

In still another embodiment, there is a base station to signal user equipment to monitor a narrowband control channel in a wideband system for supporting multiple protocols in a network, comprising a memory storage comprising instructions; and one or more processors coupled to the memory that execute the instructions to: send a first configuration signaling from the base station to configure the user equipment including a designation of one or more subframes; determine by the base station whether to signal the user equipment to monitor the one or more subframes using one of a narrowband bandwidth and a system bandwidth; in response to the base station signaling the user equipment to monitor the narrowband bandwidth, communicate with the user equipment using the narrowband bandwidth; and in response to the base station signaling the user equipment to monitor the system bandwidth, send a probe message within the narrowband bandwidth to the user equipment, the probe message signaling to the user equipment to begin monitoring the system bandwidth, and communicate with the user equipment using the system bandwidth.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIGS. 2A and 2B illustrate a PDCCH and an EPDCCH control channel structure.

DETAILED DESCRIPTION

The disclosure relates to technology for a base station signaling user equipment to monitor a narrowband control channel in a wideband system.

To reduce traffic load and power consumption, the system of the disclosure operates user equipment (UE) in a wideband bandwidth without the UE having to monitor the wideband bandwidth at all times. In particular, a base station configures the UE, including a designation of subframe(s). The base station then determines whether to signal the user equipment to monitor the subframe(s) using one of a narrowband (e.g., EPDCCH) bandwidth and a wideband (e.g., system) bandwidth. In response to the base station signaling the user equipment to monitor the narrowband bandwidth, the base station communicates with the user equipment using the narrowband bandwidth. In response to the base station signaling the user equipment to monitor the system bandwidth, the base station sends a probe message within the narrowband bandwidth to the user equipment, where the probe message signals to the user equipment to begin monitoring the system bandwidth and to communicate with the user equipment using the system bandwidth.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Figure 1:
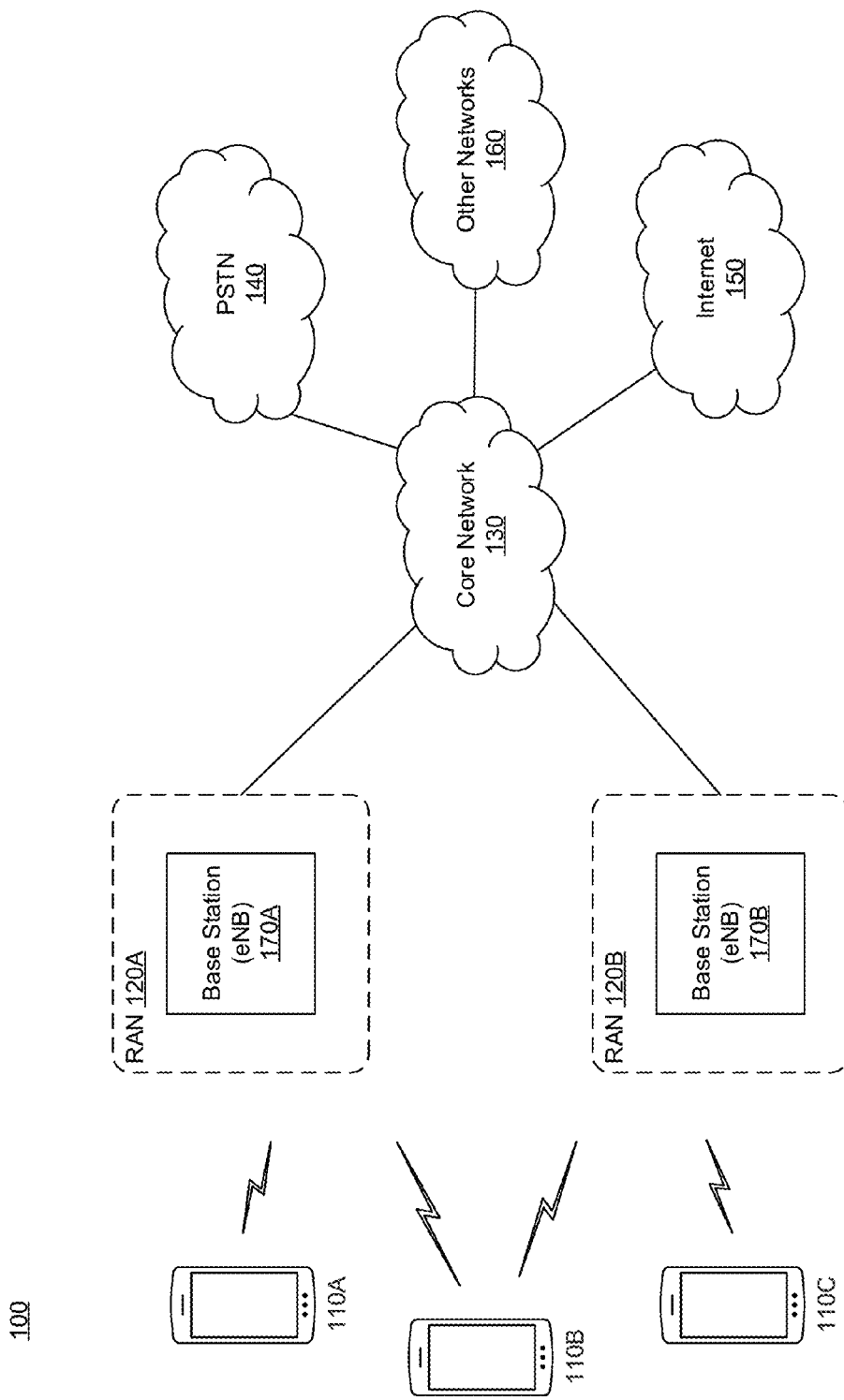
FIG. 1 illustrates an architecture of a wireless communication system in which the present technology may be implemented.

FIG. 1 illustrates a wireless network for communicating data. The communication system 100 includes, for example, user equipment (UE) 110A-110C, radio access networks (RANs) 120A-120B, a core network 130, a public switched telephone network (PSTN) 140, the Internet 150, and other networks 160. While certain numbers of these components or elements are shown in the figure, any number of these components or elements may be included in the system 100.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The UEs 110A-110C are configured to operate and/or communicate in the system 100. For example, the UEs 110A-110C are configured to transmit and/or receive wireless signals or wired signals. Each UE 110A-110C represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

In the depicted embodiment, the RANs 120A-120B include base stations 170A, 170B (collectively, base stations 170), respectively. Each of the base stations 170 is configured to wirelessly interface with one or more of the UEs 110A, 110B, 110C (collectively, UEs 110) to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the UEs 110 over one or more air interfaces (not shown) using wireless communication links. The air interfaces may utilize any suitable radio access technology.

It is contemplated that the system 100 may use multiple channel access functionality, including for example schemes in which the base stations 170 and UEs 110 are configured to implement the Long Term Evolution wireless communication standard (LTE), LTE Advanced (LTE-A), and/or LTE Broadcast (LTE-B). One evolution of LTE that is of particular interest is Wideband LTE (WB-LTE), wherein the system occupies a larger bandwidth, operates at a low latency, but is designed with the same principles as LTE. In other embodiments, the base stations 170 and UEs 110 are configured to implement UMTS, HSPA, or HSPA+ standards and protocols. Of course, other multiple access schemes and wireless protocols may be utilized.

The RANs 120A-120B are in communication with the core network 130 to provide the UEs 110 with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110 may include functionality for communicating with different wireless networks over different wireless links using different wireless technologies and/or protocols.

In one embodiment, the base stations 170 comprise a carrier aggregation component (not shown) that is configured to provide service for a plurality of UEs 110 and, more specifically, to select and allocate carriers as aggregated carriers for a selected UE 110. More specifically, the carrier configuration component of base stations 170 may be configured to receive or determine a carrier aggregation capability of a selected UE 110. The carrier aggregation component operating at the base stations 170 are operable to configure a plurality of component carriers at the base stations 170 for the selected UE 110 based on the carrier aggregation capability of the selected UE 110. Based on the selected UE(s) capability or capabilities, the base stations 170 are configured to generate and broadcast a component carrier configuration message containing component carrier configuration information that is common to the UEs 110 that specifies aggregated carriers for at least one of uplink and downlink communications. In another embodiment, base stations 170 generate and transmit component carrier configuration information that is specific to the selected UE 110. Additionally, the carrier aggregation component may be configured to select or allocate component carriers for the selected UE 110 based on at least one of quality of service needs and bandwidth of the selected UE 110. Such quality of service needs and/or required bandwidth may be specified by the UE 110 or may be inferred by a data type or data source that is to be transmitted.

Although FIG. 1 illustrates one example of a communication system, various changes may be made to FIG. 1. For example, the communication system 100 could include any number of UEs, base stations, networks, or other components in any suitable configuration.

Thus, it is apparent from the description above that all or some of the above and below described methods and processes may be performed in the network enabled devices and/or components and may be implemented through one or more processors, together with a computer program product for performing at least some of described methods and processes.

FIGS. 2A and 2B illustrate a PDCCH and an EPDCCH control channel structure. To support the transmission of downlink and uplink transport channels Downlink Shared Channel (DL-SCH) and Uplink Shared Channel (UL-SCH) control signaling is required. This control signaling enables a UE 110 to successfully receive, demodulate, and decode the DL-SCH. The Downlink Control Information (DCI) is transmitted through the Physical Downlink Control Channel (PDCCH) (FIG. 2A) or Enhanced PDCCH (EPDCCH) (FIG. 2B) and includes information about the DL-SCH resource allocation, transport format, etc.

Downlink control signaling is typically located at the start of each downlink subframe 200 in PDCCH. One of the advantages of transmitting control channel at the start of every subframe 200 is that when the UE 110 is not scheduled, the receiver circuitry may be turned off during most of the subframe 200, resulting in reduced power consumption. This is in contrast to the downlink control signaling for EPDCCH, in which the UE 110 monitors and buffers the entire bandwidth for the duration of the subframe 200 regardless of whether the UE 110 is scheduled or not. Thus, the receiver circuitry remains turned on and power consumption is increased.

The PDCCH and EPDCCH carry scheduling assignments and other control information in the form of DCI messages (formats) for a UE 110 or a group of UEs 110. The scheduling assignments can indicate the location of data in a subframe. Typically, the scheduling assignment and data are transmitted in the same subframe. Alternative, a scheduling assignment in a preceding subframe can be sent to schedule the data. The base station 170 can transmit many DCIs or PDCCHs or EPDCCHs in a subframe 200. A PDCCH and/or EPDCCH is transmitted on one control channel element (CCE) or an aggregation of several consecutive CCEs, where a CCE corresponds to 9 Resource Element Groups (REGs). As appreciated, the CCEs may be grouped into two parts—common search space and UE specific search space (the spaces can overlap). As the names imply, the common search space is used for sending control information common to all UE's, and the UE specific search space is used to send the control information for a particular UE. A combination of common and UE specific search spaces may also be employed. The EPDCCH uses an enhanced CCE (ECCE) where each ECCE corresponds to a group of resource elements. There may also be search spaces for the EPDCCH.

The EPDCCH includes the ability to support increased downlink control channel capacity, better resource granularity, additional PDSCH transmission capacity, beamforming and improved spatial reuse, and frequency-domain inter-cell interference coordination, while taking into account the coexistence with legacy terminals. However, there are some drawbacks to EPDCCH compared to PDCCH. For example, when employing EPDCCH, the UE 110 requires buffering the entire subframe 200 before decoding, which increases, among other things, the aforementioned power consumption.

Figure 3:
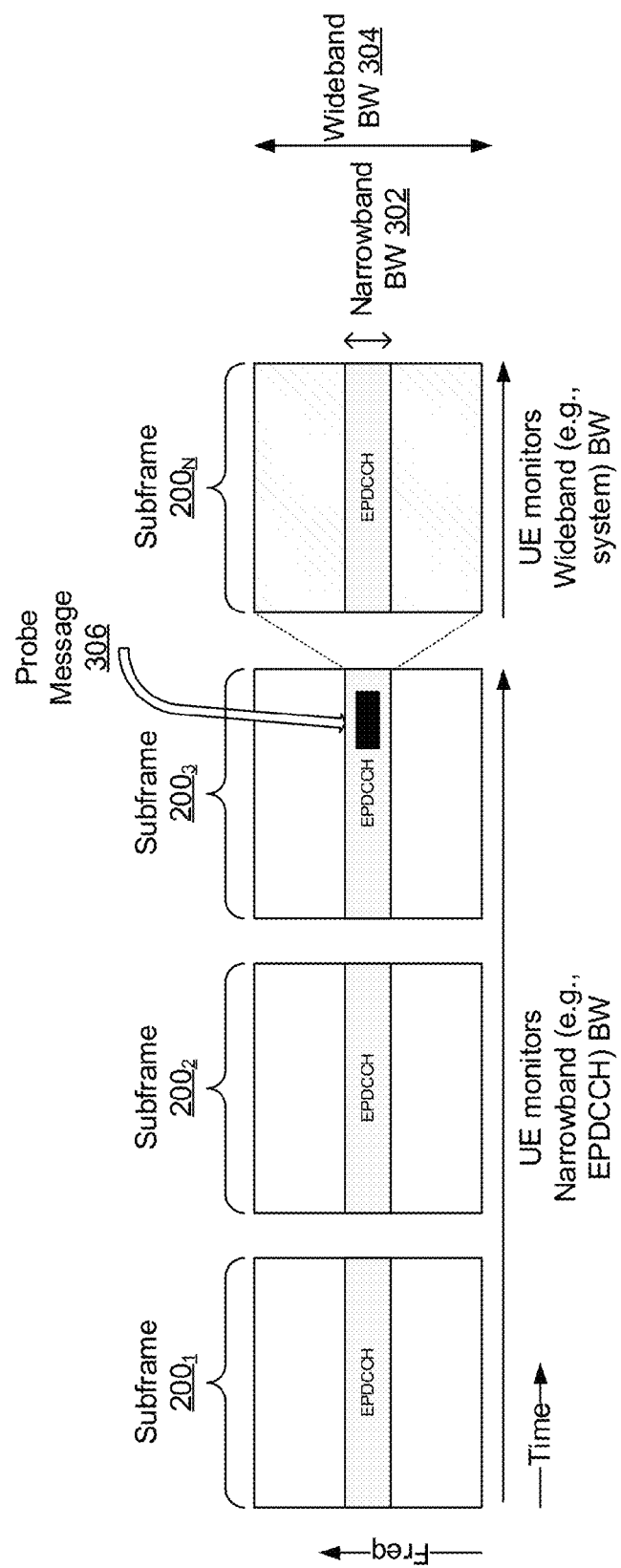
FIG. 3 illustrates an example of narrowband monitoring in accordance with an embodiment.

FIG. 3 illustrates an example of narrowband monitoring in accordance with an embodiment. In the diagram, a subframe $200_1$ to $200_N$ is received at UE 110 from a base station 170 in which a narrow portion, such as an EPDCCH bandwidth, occupies an available bandwidth of the system, such as the system bandwidth. In the example, subframes $200_1$, $200_2$ and $200_3$ illustrate a UE 110 monitoring the narrowband bandwidth (e.g., EPDCCH bandwidth) 302, whereas subframe $200_N$ illustrates the UE 110 monitoring the entire available (wideband) bandwidth (e.g., system bandwidth) 304. Although four subframes $200_1$ to $200_N$ are depicted in the embodiment, it is appreciated that any number of subframes (more or less) may be received/transmitted by the UE and base station, respectively. For example, in subframes $200_1$, $200_2$, $200_3$, a UE 110 can also receive signals and data on the EPDCCH bandwidth 302. In subframe $200_N$, a UE 110 can receive signals on the system bandwidth 304. Note that control signaling can be still received on resources located in the EPDCCH bandwidth 302. In another embodiment, the control signaling can be located at preconfigured locations in the system bandwidth. Data can be located on resources in the system bandwidth.

In this embodiment, the subframe $200_N$ may include an EPDCCH search space that occupies the narrowband bandwidth (BW) 302 (in this case, an EPDCCH bandwidth) (or a portion of the narrowband bandwidth) of the wideband bandwidth (BW) 304 (in this case, a system bandwidth). For example, if the system bandwidth 304 is 100 MHz, the EPDCCH bandwidth 302 may only occupy 10 MHz. To simplify the EPDCCH bandwidth 302 processing by the UE 110, a guard band may be optionally added on each side of the EPDCCH bandwidth 302. The guard band would act to reduce or eliminate any inter-cell interference (ICI) caused by performing a FFT on a smaller bandwidth than actually occupied.

In alternative embodiments, instead of the EPDCCH bandwidth 302 occupying part of the EPDCCH search space, the EPDCCH search space would be replaced with the EPDCCH bandwidth 302. Additionally, while the narrowband BW 302 (in this example, the EPDCCH bandwidth) is shown at the center of the system bandwidth 304, the narrowband bandwidth 302 may be placed anywhere within the system bandwidth 304. Moreover, while the EPDCCH bandwidth 302 is shown as contiguous, it is not limited to such a configuration. In one other embodiment, a virtual Direct Current (DC) subcarrier is utilized at the center of the EPDCCH band in order to facilitate demodulation, regardless of where the EPDCCH band is located (center of the band or elsewhere). For example, for downlink transmissions in LTE, the DC subcarrier can represent the carrier. The virtual DC represents the carrier for the narrowband signals.

In another embodiment, the EPDCCH bandwidth 302 can be used to communicate grants, or other physical layer control messages. Alternatively, a probe message 306 (explained below) may be sent in the EPDCCH bandwidth 302. Utilization of the EPDCCH bandwidth 302 with a probe message 306 may reduce the EPDCCH bandwidth 302 to a minimum, and could enable extremely narrowband monitoring that may result in significant power savings. This could be especially advantageous if, e.g., sensors or other types of low power consumption nodes are deployed in the system 100.

Under normal operation, the UE 110 would monitor the EPDCCH bandwidth 302 for configuration information and data from the base station 170. Since the UE 110 monitors the EPDCCH bandwidth 302, the UE 110 only requires operation of its decoding capabilities, such as an analog-to-digital converter, in the EPDCCH bandwidth 302 of, for example, 10 MHz bandwidth. Thus, the UE 110 performs a narrow Fast Fourier Transform (FFT) (e.g., 10 MHz) without covering the entire system bandwidth of, in this example, 100 MHz. The operations are analogous to the UE 110 receiving the center 6 physical resource blocks (PRBs) for initial access in a system with >6 PRBs (wider bandwidth, where each PRB occupies 180 kHz). However, one difference is after a UE 110 performs initial access, it then operates with the wider bandwidth 304.

As the UE 110 receives signaling on the EPDCCH bandwidth 302, the base station 170 may transmit the probe message 306. The probe message 306 may, for example, signal to the UE 110 to switch from monitoring the EPDCCH bandwidth 302 to begin monitoring the system bandwidth 304. That is, when receiving the probe message 306, the UE 110 starts to receive control information and data over the entire system bandwidth 304, in this example 100 MHz.

Once the UE 110 receives the probe message 306 and begins to monitor the system bandwidth 304, the UE 110 performs decoding, using for example an analog-to-digital converter, in a larger bandwidth, such as the system bandwidth of 100 MHz. This larger bandwidth requires a larger FFT to decode the received information. That is, the larger FFT requires a bandwidth that is larger than the system bandwidth 304. For example, with a 20 MHz bandwidth, there is a maximum of 2048 subcarriers in a symbol, with each subcarrier occupying 15 kHz. The bandwidth represented by the FFT is 30.72 MHz. In this case, only 20 MHz (1200 subcarriers) are used in the system. Thus, application of decoding capabilities at the UE 110 that cover the system bandwidth 304 consumes more power.

Figure 4A:
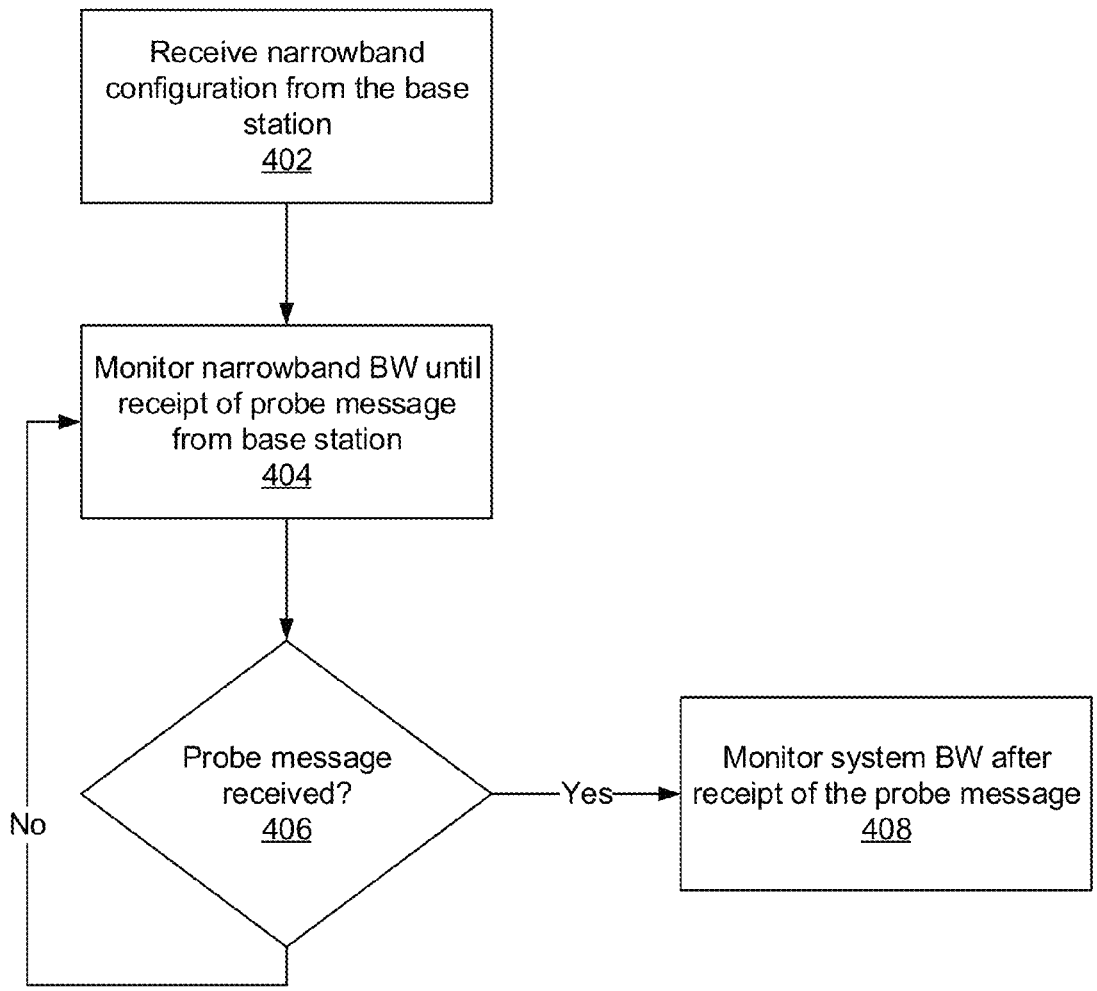
FIG. 4A illustrates an example of user equipment monitoring a bandwidth in accordance with FIG. 3.

FIG. 4A illustrates an example of user equipment monitoring a bandwidth in accordance with FIG. 3. At 402, the UE 110 receives a narrowband configuration, such as an EPDCCH configuration, from the base station 170. The UE 110 may receive the configuration information by the base station 170 (e.g., the serving base station or any other base station) signaling using, for example, a Dedicated RRC signaling, Common RRC signaling (system information broadcast (SIB)), or a Physical layer message (DCI).

Once the UE 110 begins operation in response to the configuration signaling at 404, the UE 110 monitors the EPDCCH bandwidth 302. The UE 110 continues to monitor the EPDCCH bandwidth 302 (e.g., subframes $200_1$ to $200_3$ in FIG. 3) until receipt of a probe message 306 at 406. While monitoring the EPDCCH bandwidth 302, the UE 110 does not receive any messages outside of the EPDCCH bandwidth 302. However, upon receipt of the probe message 306, the UE 110 begins to operate by monitoring the entire system bandwidth 304 (e.g., subframe $200_N$ in FIG. 3) at 408. For example, if the UE 110 receives a probe message in subframe k, it may begin to monitor the system bandwidth in subframe k+1. In another example, the UE 110 may monitor the system bandwidth k+d., where d is a positive integer.

The probe message 306 may be, but is not limited to, a dedicated radio resource control (RRC) signaling, common RRC signaling or a physical layer message, such as a downlink control information (DCI), as explained in more detail below. Moreover, although the probe message 306 is illustrated at the end of the EPDCCH search space, it is appreciated that the probe message 306 may located anywhere within the EPDCCH search space or span the entire EPDCCH search space.

The probe message 306 (FIG. 3) may also include, but is not limited to, a time command indicating when to switch to the system bandwidth 304 monitoring from the EPDCCH bandwidth 302 monitoring. Similarly, if other bandwidths are being monitored between the EPDCCH bandwidth 302 and the system bandwidth 304, the probe message 306 may inform the UE 110 what bandwidth(s) to monitor, as well as duration information about when to switch back to EPDCCH BW monitoring.

In other embodiments, the probe message 306 may be a DCI command received on the EPDCCH bandwidth 302, a reference signal influenced by a signature as described in R1-120045, 3GPP TSG RAN WG1 meeting #68, Feb. 6-10, 2012. In this case, the UE 110 may not need to monitor the EPDCCH bandwidth 302 for the entire subframe $200_N$ duration. Instead, the UE 110 may only need to monitor until the signature has been detected. For example, if the signature is on the first symbol of the subframe $200_N$, the UE 110 may terminate monitoring after the first symbol (once the first symbol has been processed).

As noted above, the probe message 306 may also be a dedicated RRC message. In this case, the existing LTE RRC signaling has a time ambiguity related to when the RRC message applies. In order to avoid such a problem, a time stamp may be added to indicate the frame index when the UE 110 should switch to system bandwidth 304 monitoring. Additionally, in an alternative embodiment, the probe message 306 may be a common RRC message.

When the probe message 306 is a DCI, several non-limiting embodiments may be employed. In a first embodiment, the DCI could be an individual DCI having a specific format sent and that is cyclic redundancy check (CRC) scrambled with a cell radio network temporary identifier (C-RNTI). The CRC (16 or 24 bits) may be scrambled, for example, by a UE specific identifier. The DCI in this embodiment may contain one bit to indicate the switch (mandatory), a time stamp (which could be implicit, e.g., next subframe), and a duration to perform system monitoring, etc.

In a second embodiment, the DCI format may be the same as described in the first embodiment, but with the CRC scrambled with a group-RNTI (G-RNTI). Here, a group of UEs 110 may be assigned the G-RNTI through either RRC signaling or MAC signaling, and the CRC may be scrambled by a group identifier. The command in the DCI would apply to all UEs 110 assigned this G-RNTI. For example, the DCI message may contain: narrowband indicator (NBI) command number 1, NBI command number 2, NBI command number N, where NBI is a one-bit field with NBI=1 if the UE 110 needs to switch to wideband monitoring, and NBI=0 otherwise.

In a third embodiment, the DCI could be sent in a format similar to a DCI format 3, having a group command, with each UE 110 having an index i in the group, and receiving a probe from the $i^{th}$ bit in a bitmap included in the DCI. For example, NBI command number 1, UE ID number 1, NBI command number N, UE ID number N. In this example, NBI command #1 applies to the UE with UE ID #1. If less than N commands are sent, this field would be padded with, for example, zeroes to be the same length as with N commands. The CRC may be either unscrambled or scrambled with a cell-specific identified.

In an alternative embodiment, the probe message 306 may be implicitly interpreted. For example, the probe message 306 may be assumed on a pre-determined subset of subframes $200_N$. That is, a probe message 306 is not actually received, but the UE 110 assumes receipt of the probe message 306 on a given subframe(s) $200_N$. The UE 110 may monitor the EPDCCH bandwidth 302 during the subframes $200_N$ upon which receipt of the probe message 306 is assumed (implicit), and monitor the system bandwidth 304 on other subframe(s) $200_N$. The determination of which bandwidth to monitor could be based on, for example, a frame/subframe index and/or UE ID (e.g., an RNTI value). The UE 110 may also receive a bitmap (e.g., by RRC signaling) to indicate on which subframe(s) $200_N$ it monitors the EPDCCH bandwidth 302 or system bandwidth 304.

Figure 4B:
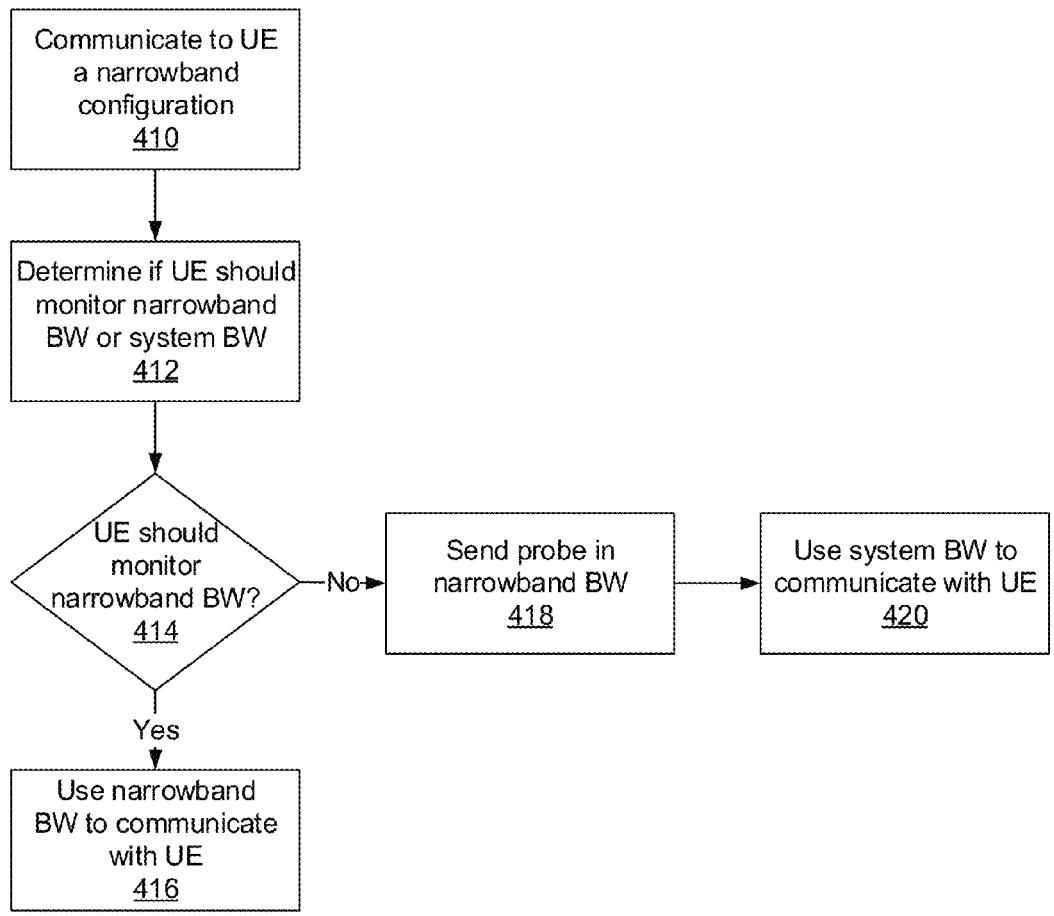
FIG. 4B illustrates an example of a base station sending a probe message to monitor a bandwidth in accordance with FIG. 3.

FIG. 4B illustrates an example of a base station sending a probe message to monitor a bandwidth in accordance with FIG. 3. At 410, the base station 170 communicates a narrowband configuration, as described above, to the UE 110. The base station 170, at 412, determines whether the UE 110 should be monitoring the narrowband bandwidth 302 (e.g., a control channel, such as EPDCCH) or the wideband bandwidth 304 (e.g., system bandwidth) by monitoring, for example, traffic load and interference in the system 100 for subframe $200_N$.

If the base station 170 determines that the UE 110 should monitor the narrowband bandwidth 302 at 414, then the base station 170 uses the narrowband bandwidth 302 to communicate with the UE 110 for subframe $200_N$. If, at 414, the base station 170 determines that the UE 110 should monitor the wideband bandwidth 304 for subframe $200_N$, then the base station 170 sends a probe message 306 to the UE 110 in an earlier subframe such subframe $200_{N-1}$, as described above, at 418, and uses the system bandwidth 304 to communicate with the UE 110 for subframe $200_N$ at 420.

In order to receive the EPDCCH information, the UE 110 may need to perform beamforming. In this regard, the UE 110 may utilize default transmission parameter(s), such as the latest reported rank and analog/digital beamforming in the transmitter and the most recently received beamforming in the receiver. In an alternative embodiment, the network could send this information to the UE 110 through signaling. This signaling may be conveyed, for example, on the EPDCCH bandwidth 302, thereby providing sufficient information for the UE 110 to perform the beamforming necessary to receive the EPDCCH bandwidth 302 over a period of time. Then, when the probe message 306 is received, the probe message 306 may be combined with a command to start the wideband beamforming. For example, the probe message 306 could assign, explicitly or implicitly, uplink resources for the UE 110 to transmit pilot signals.

It is appreciated that the control channel is referred to in the embodiments as EPDCCH. However, the control channel may be substantially different from a conventional EPDCCH. For instance, if a multiple access scheme in a system 100 is time division multiple access (TDMA), a UE 110 may receive an entire system bandwidth 304. In such a case, some resource elements in the time/frequency grid at known locations can be used to transmit the information to the UE 110. In this embodiment, a probe message 306 may still be required in order to determine which bandwidth to monitor. The probe may then be transmitted on the resource elements at known location.

For example, on the subframe $200_{N-1}$ preceding the subframe $200_N$ where the UE 110 receives data, the bandwidth may require an indication to switch to from narrowband bandwidth 302 monitoring to wideband bandwidth 304 monitoring. In this case, the probe message 306 may, for example, be located in a fixed region of the subframe $200_N$, and may contain the UE ID for the UE 110 scheduled the next subframe $200_{N+1}$.

In an alternative embodiment, the probe message 306 may be employed for UEs 110 considered for scheduling (but not for those not being considered for scheduling). For example, a UE 110 may be scheduled in a subframe(s) $200_{N+1}$ following a subframe(s) $200_N$, but would need to monitor the wideband bandwidth 304. This may simplify scheduling, since the base station 170 would perform scheduling on a single frame at a time.

In another embodiment, the system 100 may employ a semi-persistent scheduling for narrowband/wideband bandwidth monitoring. Semi-persistent scheduling may be employed for traffic (e.g., real-time traffic) that is periodical in nature. For example, a codec could deliver a frame every 20 ms. In such a case, the system 100 may employ an automatic, periodic pattern that repeats. For example, using the 20 ms codec example, the pattern could be a bitmap, with '0' indicating narrowband bandwidth 302 monitoring, and '1' indicating wideband bandwidth 304 monitoring. In an alternative embodiment, the pattern could be signaled, for example, by four parameters: T1, the periodicity of the pattern; O1, the first subframe where to apply the pattern (may be a priori known, based on RNTI, etc.); O2, the delay after which to switch from narrowband bandwidth 302 to wideband bandwidth 304 monitoring; and T2, the number of subframes $200_N$ on which to use wideband bandwidth 304 monitoring, starting after the O2 subframe $200_N$.

On subframe(s) $200_N$, where there is no wideband bandwidth 304 monitoring, narrowband bandwidth 302 monitoring may be used by the UE 110. Using the previous example of the codec delivering a subframe $200_N$ every 20 ms, the UE 110 could switch to wideband bandwidth 304 monitoring when the codec subframe is expected, remain in wideband bandwidth 304 monitoring for a select number of subframes $200_N$ (to account for signaling delay, etc.), and then switch back to narrowband bandwidth 302 monitoring until the next codec subframe is expected, thereby reducing power consumption.

Figure 5A:
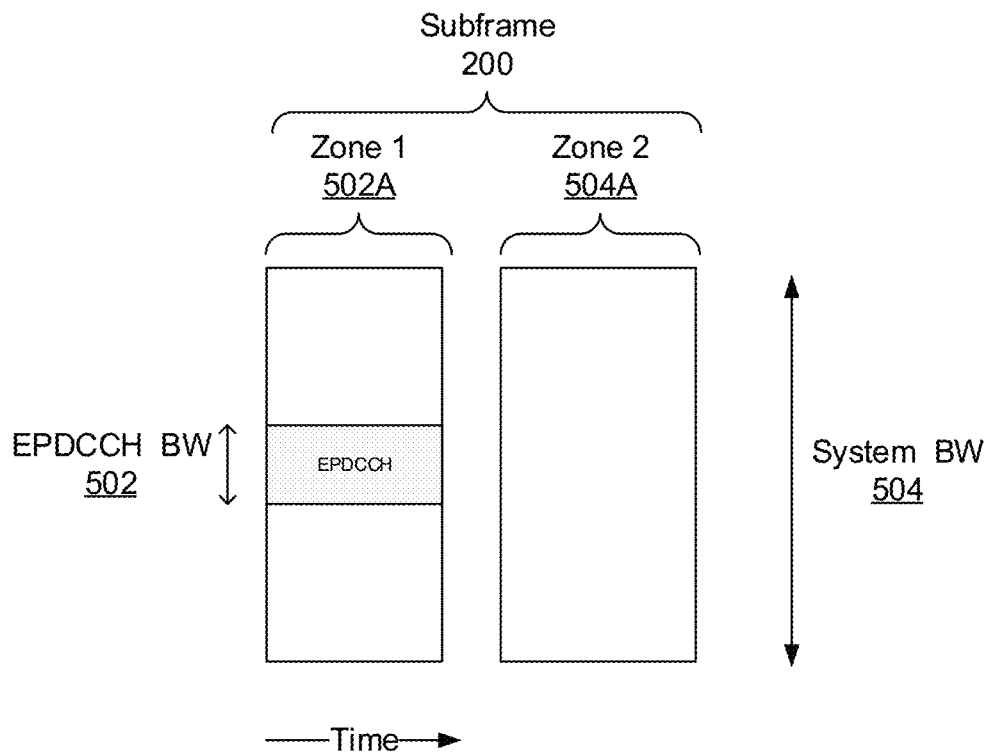
FIGS. 5A and 5B illustrate an example of dual-band monitoring by user equipment.
Figure 5B:
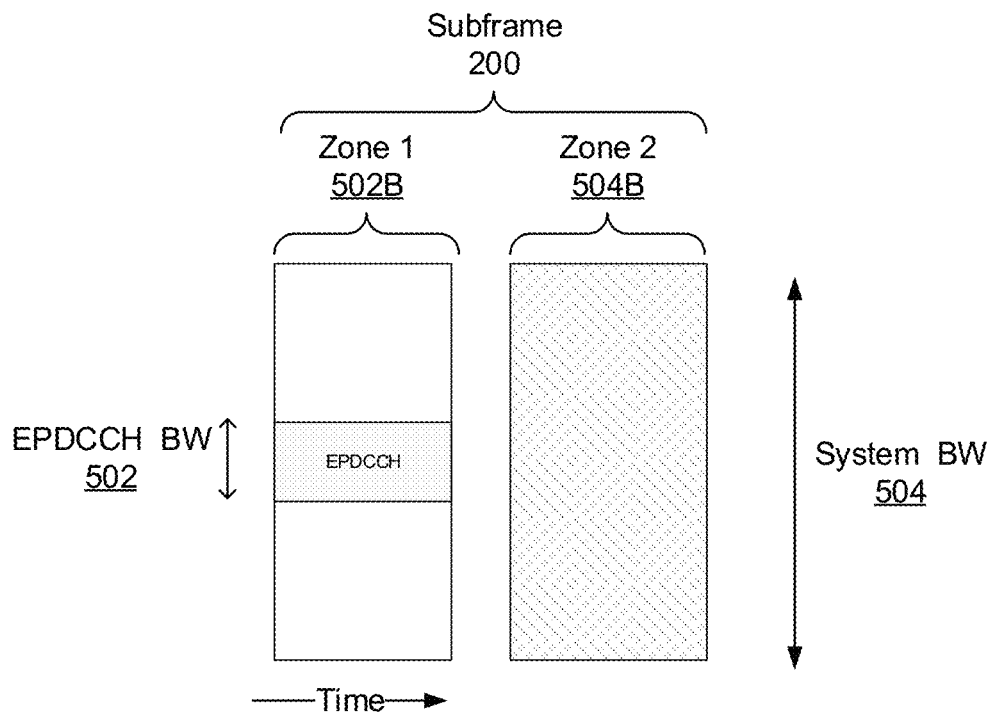

FIGS. 5A and 5B illustrate an example of dual-band monitoring by user equipment. In the figures, the downlink (DL) portion of the subframe 200 is split into two zones 502A/B (zone 1) and 504A/B (zone 2). In the first zone 502A/B, the UE 110 receives data on the system bandwidth 504 and control information on the EPDCCH bandwidth 502, and in the second zone 504A/B, the UE 110 may receive data on the system bandwidth 504 (if an assignment is received, as explained below).

The UEs 110 may also be categorized into two sets, for example, set A and set B. FIGS. 5A and 5B illustrate examples of UEs 110 of set A, in which the UEs 110 may be configured to monitor the system bandwidth 504. The UEs 110 of set A decode information on the EPDCCH bandwidth 502 in the first zone of the subframe 502A, and may receive data in both the first and second zones of the subframe 502A and 504A.

Thus, in the illustrated example, the UE 110 may receive an assignment in the EPDCCH bandwidth 502 in the first zone of the subframe 502A. When an assignment is received (and processed), the UE 110 may begin to monitor the second zone in subframe 504A (FIG. 5A). If an assignment is not received in the EPDCCH bandwidth 502, then the second zone of the subframe 504B is not monitored by the UE 110 (FIG. 5B).

It is appreciated, although not illustrated, that the EPDCCH bandwidth in the first zone of a subframe may also extend into the second zone of a subframe.

A UE 110 may be determined to be a member of a set (e.g., set A or B) according to one of the following non-limiting embodiments: (a) set selection may be sent with or determined based on the UE category/UE capability, (b) set selection may be done by the base station and sent by RRC signaling (dedicated or common) to UE, or (c) set selection may be done by base station and sent on a DCI.

The determination of which set any one UE 110 is a member of may be implied from one of (a), (b) or (c) and may also depend on the subframe/frame index and the C-RNTI. In one embodiment, the UE 110 may receive a bitmap (e.g., by RRC signaling) to indicate whether a UE 110 should be set to set A or B and on which subframes $200_N$. In this case, the set of subframe/frame indexes could be determined to have a UE 110 operating a pre-defined portion of the time in a set and the rest of the time in the second set. This portion of the time could be selected, for example, based on parameters such as power consumption, fairness access to the media, etc. Alternatively, in another embodiment, the UE 110 may be configured with a default configuration (e.g., set A). In this case, the base station 170 may send a command to switch to from one set to another set when necessary.

It is appreciated that the disclosed embodiments are not limited to two sets. Additional embodiments may exist where more than two sets are implemented. For example, a set C may exist in which an intermediate bandwidth operates between set A and set B.

Figure 6A:
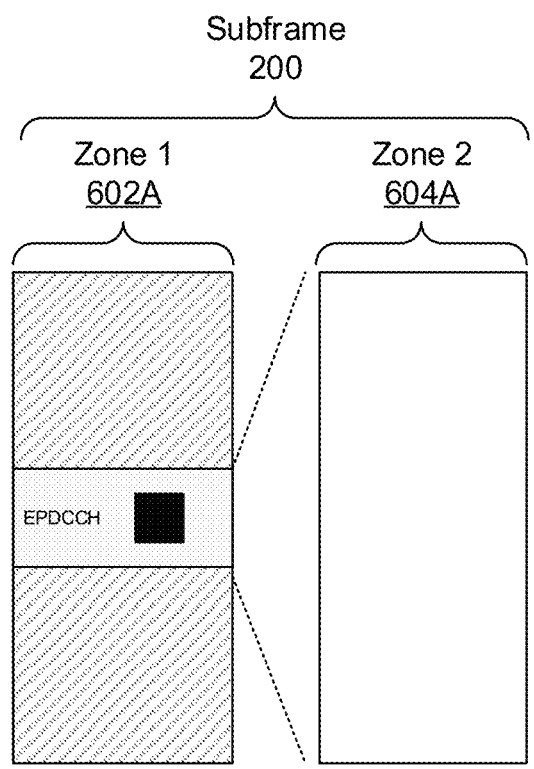
FIGS. 6A and 6B illustrate an example of dual-band monitoring by user equipment.
Figure 6B:
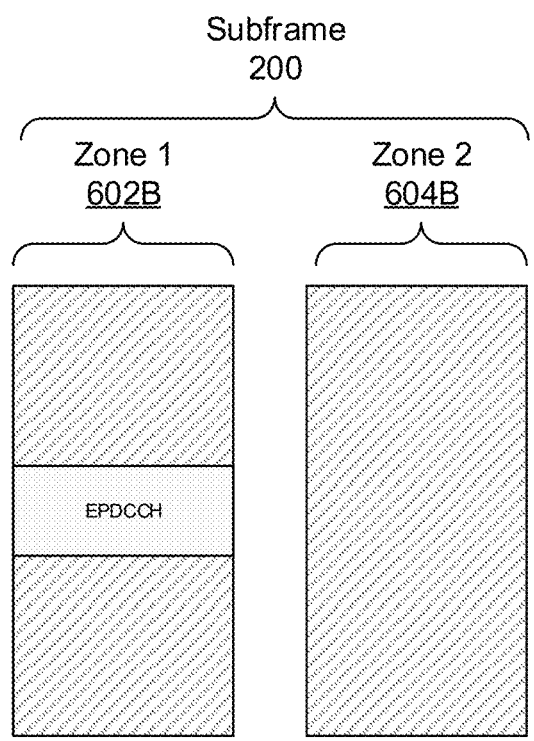

FIGS. 6A and 6B illustrate an example of dual-band monitoring by user equipment. In the figures, similar to FIGS. 5A and 5B, the downlink (DL) portion of the subframe 200 is split into two zones 602A/B (zone 1) and 604A/B (zone 2). However, implementation of the zones 602A/B and 604A/B for UEs 110 is different.

In the example of FIGS. 6A and 6B, the UEs 110 are in set B. The UEs 110 in set B may be configured to monitor only the EPDCCH bandwidth 502 in the first zone of the subframe 502B. Once an assignment (e.g., probe message 306) is received on the EPDCCH bandwidth 502 by the UE 110, the UE 110 may begin to monitor the system bandwidth 504 in the second zone of the subframe 502B (FIG. 6A). If an assignment is not received by the UE 110 on the EPDCCH bandwidth 502, then the system bandwidth 504 in the second zone of the subframe 504B is not monitored (FIG. 6B). Similar to the description of FIGS. 5A and 5B, the EPDCCH 302 may also extend into the second zone of subframe 604A, although not illustrated.

Figure 7A:
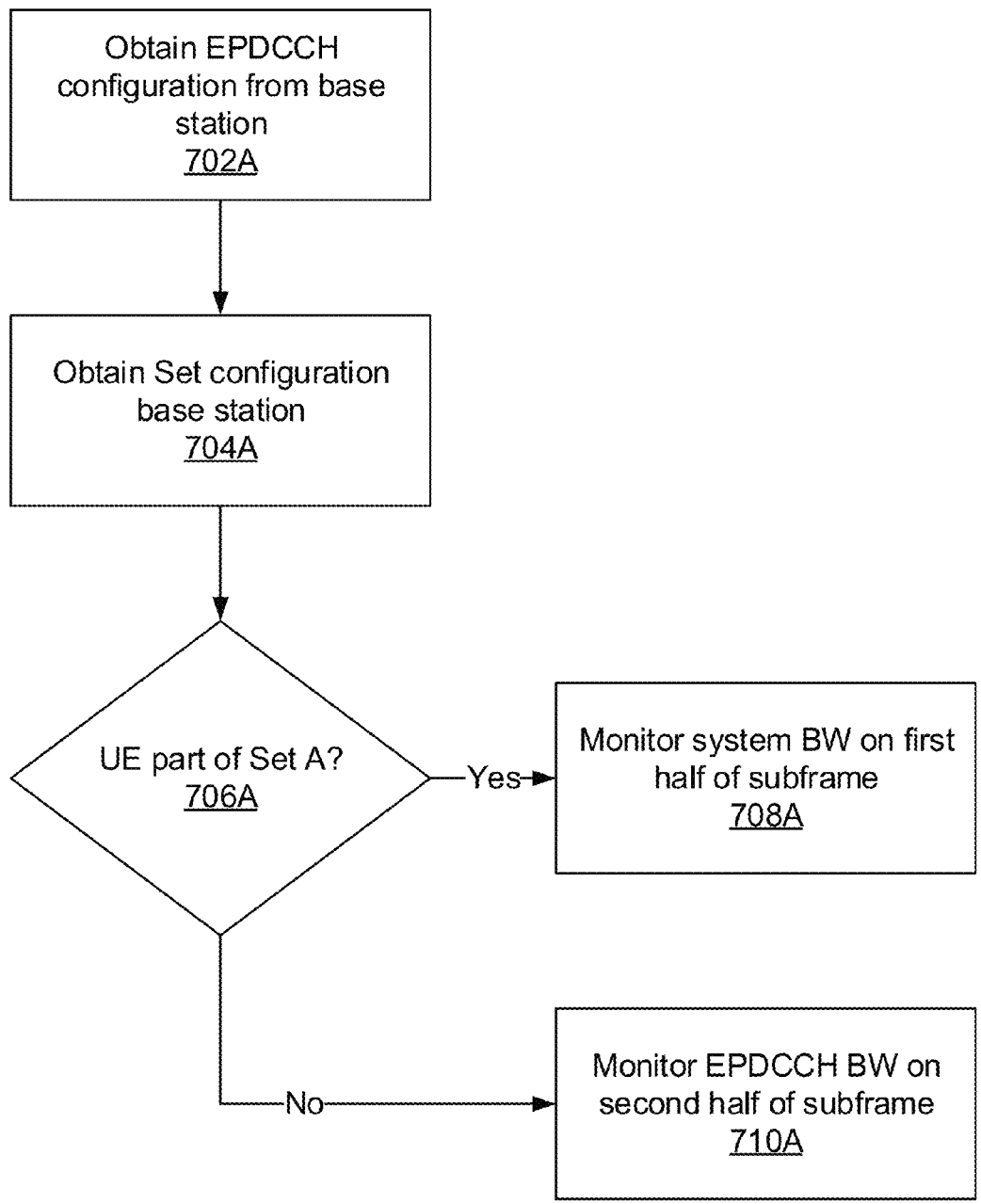
FIG. 7A is a flow diagram for dual-band monitoring by user equipment in accordance with FIGS. 5A, 5B, 6A and 6B.

FIG. 7A is a flow diagram for dual-band monitoring by user equipment in accordance with FIGS. 5A, 5B, 6A and 6B. At 702A, the UE 110 obtains the narrowband (e.g., EPDCCH) configuration from the base station 170 including a designation of subframe(s) $200_N$, as described above. At 704A, the UE 110 obtains a set configuration. The set configuration assigns a member of a set, such as set A (FIGS. 5A, 5B) or set B (FIGS. 6A, 6B), to the UE 110.

If the UE 110 is assigned set A, at 706A, the UE 110 monitors the system bandwidth 502 on the first zone of the subframe 502A, and may receive an assignment on the EPDCCH bandwidth 502 for either the first or second zones of the subframe 502A, 504A on the entire system bandwidth 504.

If the UE is assigned set B at 704A, then at 706A it is determined that the UE 110 is not part of set A. In this case, the UE 110 monitors the EPDCCH bandwidth 502 only on the first zone of the subframe 602A, and may receive an assignment on the EPDCCH bandwidth 502 for the second zone of the subframe 604A on the entire system bandwidth 504 at 710A.

Figure 7B:
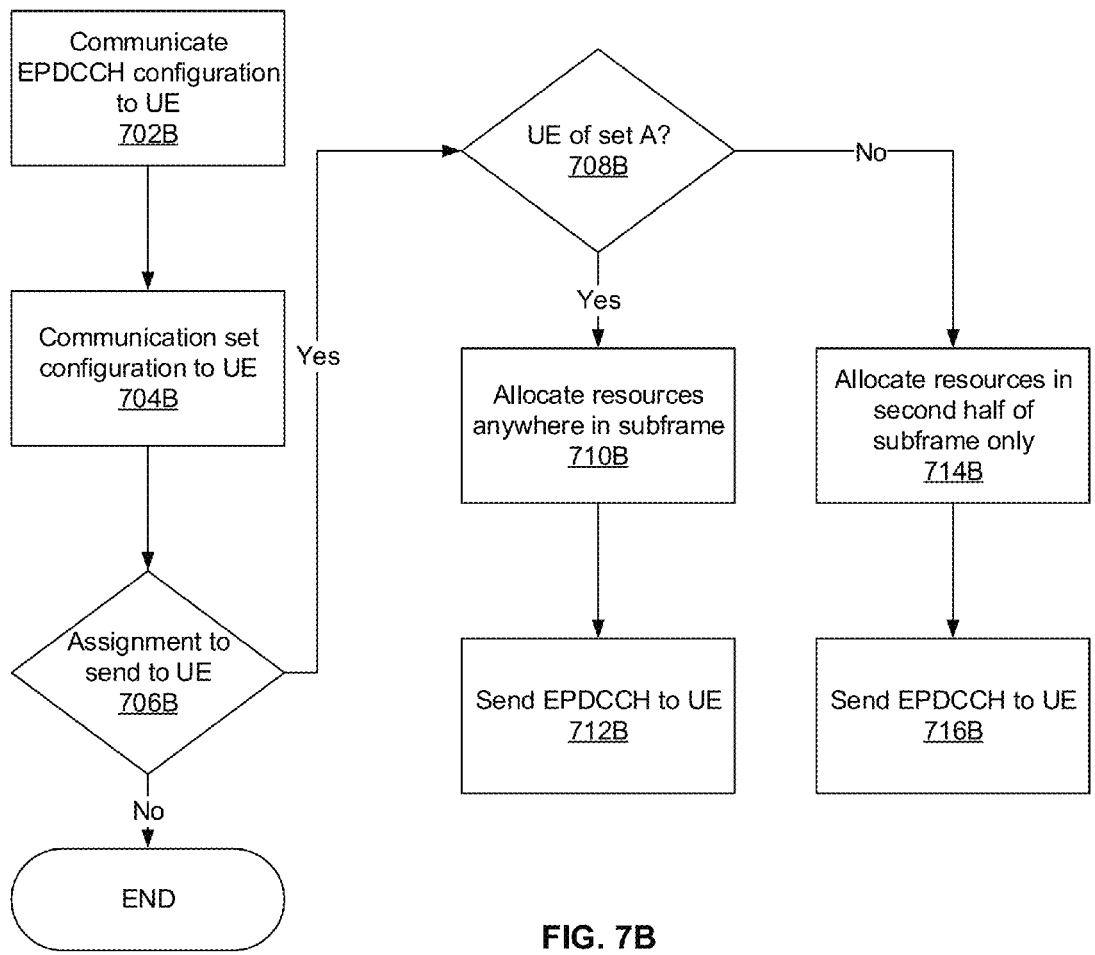
FIG. 7B is a flow diagram for dual-band monitoring by a base station in accordance with FIGS. 5A, 5B, 6A and 6B.

FIG. 7B is a flow diagram for dual-band monitoring by a base station in accordance with FIGS. 5A, 5B, 6A and 6B. At 702B, the base station 170 sends the narrowband (e.g., EPDCCH) configuration to the UE 110 including a designation of subframe(s) $200_N$, as described above. At 704B, the base station 170 sends a set configuration to the UE 110. The set configuration assigns a member of a set, such as set A or B (FIGS. 5A/B and 6A/B), by the base station 170.

At 706B, the base station 170 determines whether an assignment should be sent to the UE 110. If no assignment is required, then the process ends. Otherwise, if the base station 170 determines an assignment is to be sent at 706B, then the process proceeds to 708B to determine whether the UE 110 was configured as part of set A or B.

If the UE 110 is assigned set A by the base station 170, at 706B, the base station 170 allocates resources anywhere in the subframe (e.g., EPDCCH bandwidth and/or system bandwidth) to the UE 110 at 710B, and sends the EPDCCH information to the UE 110 at 712B. If the UE is assigned set B at 706B, the base station 170 allocates resources in the second zone of the subframe 604A (in the case an assignment is received) to the UE 110 at 714B, and sends the EPDCCH information to the UE 110 at 712B.

Figure 8A:
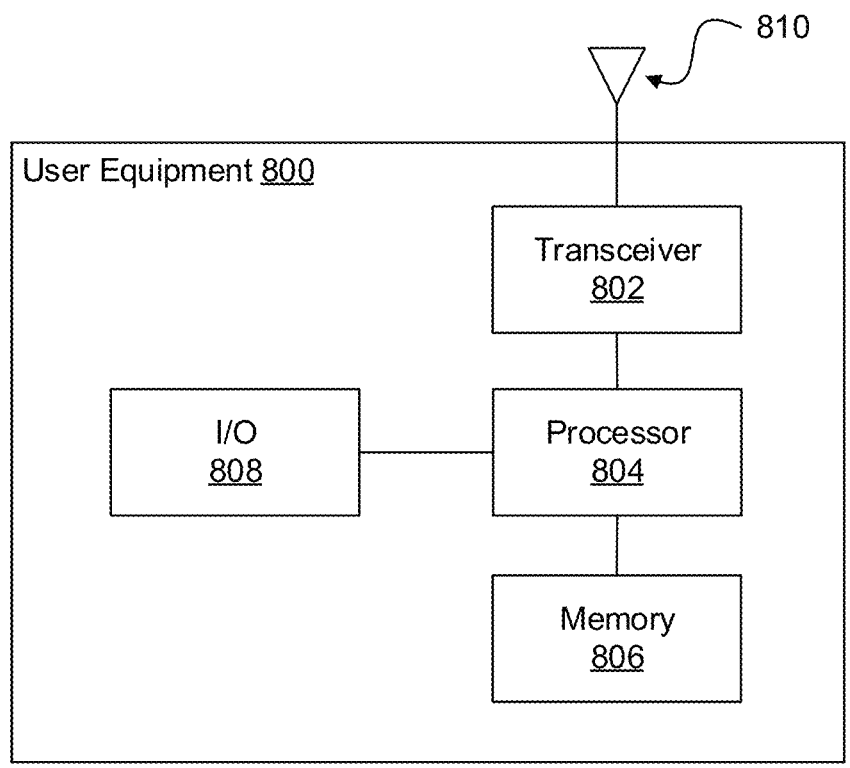
FIG. 8A illustrates example user equipment that may implement the methods and teachings according to this disclosure.

FIG. 8A illustrates example user equipment that may implement the methods and teachings according to this disclosure. As shown in the figure, the UE 800 includes at least one processor 0804. The processor 804 implements various processing operations of the UE 800. For example, the processor 804 may perform signal coding, data processing, power control, input/output processing, or any other functionality enabling the UE 900 to operate in the system 100 (FIG. 1). The processor 800 may include any suitable processing or computing device configured to perform one or more operations. For example, the processor 800 may include a microprocessor, microcontroller, digital signal processor, field programmable gate array, or application specific integrated circuit.

The UE 800 also includes at least one transceiver 902. The transceiver 802 is configured to modulate data or other content for transmission by at least one antenna 810. The transceiver 802 is also configured to demodulate data or other content received by the at least one antenna 810. Each transceiver 802 may include any suitable structure for generating signals for wireless transmission and/or processing signals received wirelessly. Each antenna 810 includes any suitable structure for transmitting and/or receiving wireless signals. It is appreciated that one or multiple transceivers 802 could be used in the UE 800, and one or multiple antennas 810 could be used in the UE 800. Although shown as a single functional unit, a transceiver 802 may also be implemented using at least one transmitter and at least one separate receiver.

The UE 800 further includes one or more input/output devices 808. The input/output devices 808 facilitate interaction with a user. Each input/output device 808 includes any suitable structure for providing information to or receiving information from a user, such as a speaker, microphone, keypad, keyboard, display, or touch screen.

In addition, the UE 800 includes at least one memory 806. The memory 806 stores instructions and data used, generated, or collected by the UE 800. For example, the memory 806 could store software or firmware instructions executed by the processor(s) 804 and data used to reduce or eliminate interference in incoming signals. Each memory 806 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 8B:
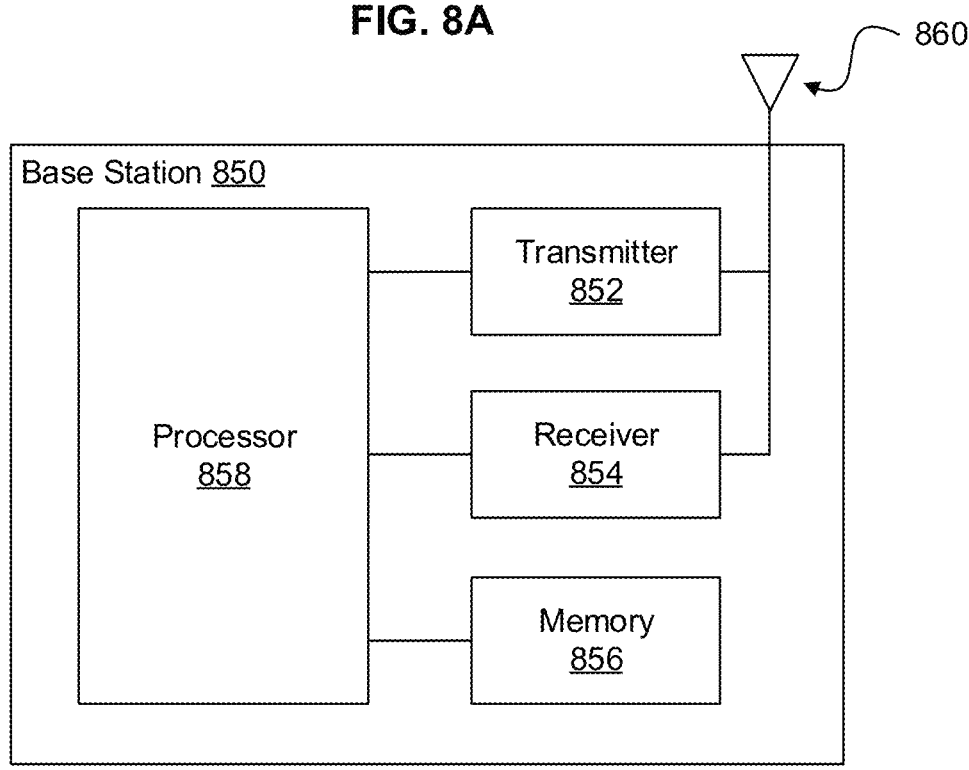
FIG. 8B illustrates example base station that may implement the methods and teachings according to this disclosure

FIG. 8B illustrates example base station that may implement the methods and teachings according to this disclosure. As shown in the figure, the base station 850 includes at least one processor 858, at least one transmitter 852, at least one receiver 854, one or more antennas 860, and at least one memory 856. The processor 858 implements various processing operations of the base station 850, such as signal coding, data processing, power control, input/output processing, or any other functionality. Each processor 858 includes any suitable processing or computing device configured to perform one or more operations. Each processor 858 could, for example, include a microprocessor, microcontroller, digital signal processor, field programmable gate array, or application specific integrated circuit.

Each transmitter 852 includes any suitable structure for generating signals for wireless transmission to one or more UEs or other devices. Each receiver 854 includes any suitable structure for processing signals received wirelessly from one or more UEs or other devices. Although shown as separate components, at least one transmitter 852 and at least one receiver 854 could be combined into a transceiver. Each antenna 860 includes any suitable structure for transmitting and/or receiving wireless signals. While a common antenna 860 is shown here as being coupled to both the transmitter 852 and the receiver 854, one or more antennas 860 could be coupled to the transmitter(s) 852, and one or more separate antennas 860 could be coupled to the receiver(s) 854. Each memory 856 includes any suitable volatile and/or non-volatile storage and retrieval device(s).

Figure 9:
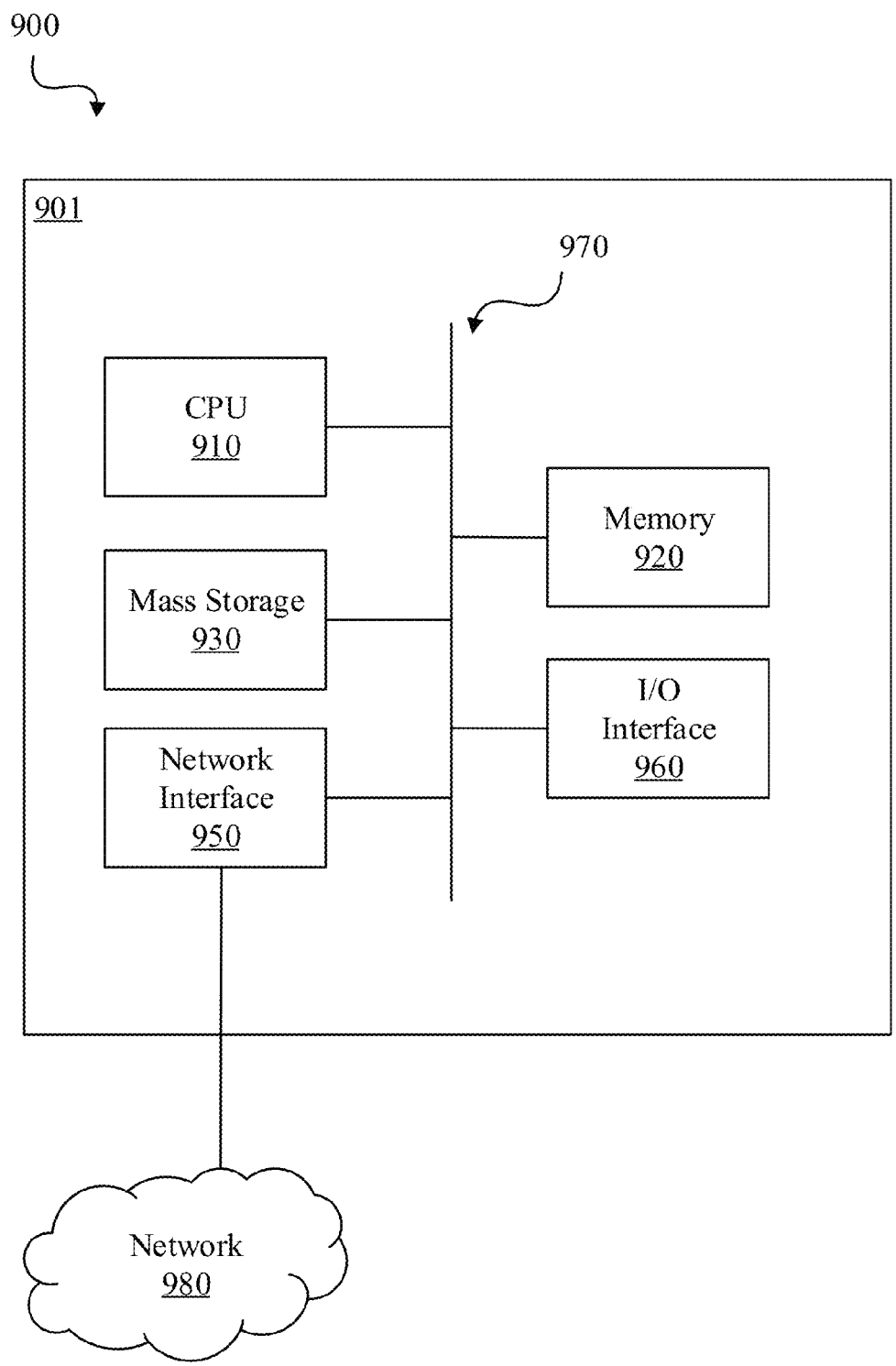
FIG. 9 illustrates a block diagram of a network system that can be used to implement various embodiments.

FIG. 9 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 901 equipped with one or more input/output devices, such as network interfaces, storage interfaces, and the like. The processing unit 901 may include a central processing unit (CPU) 910, a memory 920, a mass storage device 930, and an I/O interface 960 connected to a bus. The bus may be one or more of any type of several bus architectures including a memory bus or memory controller, a peripheral bus or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. The mass storage device 930 may comprise any type of storage device configured to store data, programs, and other information and to make the data, programs, and other information accessible via the bus. The mass storage device 930 may comprise, for example, one or more of a solid state drive, hard disk drive, a magnetic disk drive, an optical disk drive, or the like.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

In one alternative embodiment, the UE 110 may receive the narrowband (EPDCCH) configuration through dedicated RRC signaling. In this case, the base station 170 starts transmitting only control information for at least one subframe, and then starts data and control transmission (e.g., TTI aligned). The control information transmitted before data transmission may use a special format (e.g., initial format for EPDCCH), and when data transmission starts, the EPDCCH information is transmitted with the normal format. The EPDCCH, either using the initial or normal format, is a wideband signal. At the UE 110, upon receiving the RRC signaling, the UE 110 starts monitoring the wideband bandwidth 304 to detect the EPDCCH information with the initial format. After a predefined number of subframes, the data transmission starts and the UE 110 has knowledge that the EPDCCH format would be the normal format. Here, the EPDCCH format and the number of subframes transmitted with the initial EPDCCH format are part of the UE configuration. The initial EPDCCH format can be similar to the normal EPDCCH format, but the transmitted information is different. Additionally, the transmit power can be different from the power of the normal EPDCCH format transmission.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for a base station to signal user equipment to monitor a narrowband control channel in a wideband system, comprising:
    the base station sending a first configuration signaling to configure the user equipment including a designation of one or more subframes;
    the base station determining whether to signal the user equipment to monitor the one or more subframes using one of a narrowband bandwidth and a system bandwidth;
    in response to the base station signaling the user equipment to monitor the narrowband bandwidth, communicating with the user equipment using the narrowband bandwidth; and
    in response to the base station signaling the user equipment to monitor the system bandwidth,
        sending a probe message within the narrowband bandwidth to the user equipment, the probe message signaling to the user equipment to begin monitoring the system bandwidth, and
        communicating with the user equipment using the system bandwidth.

2. The method of claim 1, wherein the first configuration is an EPDCCH search space configuration signaling to configure the user equipment, the EPDCCH search space configuration including the designation of the one or more subframes.

3. The method of claim 1, wherein the narrowband bandwidth is an EPDCCH bandwidth and the system bandwidth is a wideband bandwidth.

4. The method claim 1, wherein the probe message includes at least one of:
    (a) a time command indicating to the user equipment when to switch to the system bandwidth,
    (b) a bandwidth indicator indicating a bandwidth for the user equipment to monitor between the narrowband bandwidth and the system bandwidth, and
    (c) duration information indicating to the user equipment when to switch from monitoring the system bandwidth to the narrowband bandwidth.

5. The method of claim 4, wherein the probe message is one of a dedicated radio resource control (RRC) signaling, common RRC signaling and physical layer message.

6. The method of claim 1, wherein the probe message is a downlink control information (DCI) message and includes one of:
    (a) a group command, with the user equipment having an index i in the group, where the user equipment receives the probe message in the $i^{th}$ bit in a bitmap included in the DCI,
    (b) a cyclic redundancy check (CRC) scrambled with a cell radio network temporary Identifier (C-RNTI) having a bit indicating to the user equipment to switch from one of the narrowband bandwidth to the system bandwidth and the system bandwidth to the narrowband bandwidth, a time stamp and a duration to of time to monitor the system bandwidth, and
    (c) a cyclic redundancy check (CRC) scrambled with a group radio network temporary Identifier (G-RNTI) each having a bit indicating to a respective user equipment to switch from one of the narrowband bandwidth to the system bandwidth and the system bandwidth to the narrowband bandwidth, a time stamp and a duration to of time to monitor the system bandwidth.

7. The method of claim 1, wherein
the first configuration signaling indicates a semi-persistent scheduling of the one or more subframes delivered by the base station, and
the probe message includes a new data indicator field that is set to a first value to indicate the narrowband bandwidth monitoring by the user equipment and is set to a second value to indicate the system bandwidth monitoring by the user equipment.

8. The method of claim 1, wherein the one or more subframes are divided into a first zone including the narrowband bandwidth and the system bandwidth, and a second zone including the system bandwidth, the method further comprising:
the base station sends a second configuration signaling to configure the user equipment as a member of one of a first and second set, where the members of the first set are configured to monitor the system bandwidth and the members of the second set are configured to monitor the narrowband bandwidth.

9. The method of claim 8, further comprising:
the base station determining whether to send an assignment to the user equipment;
in response to the base station sending the assignment and determining the user equipment is a member of the first set,
allocating resources in one or more of the first zone and the second zone of the one or more subframes, and
sending the assignment including the allocation of resources in the first zone to the user equipment; and
in response to the base station sending the assignment and determining the user equipment is a member of the second set,
allocating resources in the second zone of the one or more subframes, and
sending the assignment as the probe message, including the allocation of resources, in the second zone to the user equipment.

10. A non-transitory computer-readable medium storing computer instructions for a base station to signal user equipment to monitor a narrowband control channel in a wideband system, that when executed by one or more processors, perform the steps of:
the base station sending a first configuration signaling to configure the user equipment including a designation of one or more subframes;
the base station determining whether to signal the user equipment to monitor the one or more subframes using one of a narrowband bandwidth and a system bandwidth;
in response to the base station signaling the user equipment to monitor the narrowband bandwidth, communicating with the user equipment using the narrowband bandwidth; and
in response to the base station signaling the user equipment to monitor the system bandwidth,
sending a probe message within the narrowband bandwidth to the user equipment, the probe message signaling to the user equipment to begin monitoring the system bandwidth, and
communicating with the user equipment using the system bandwidth.

11. The non-transitory computer-readable medium of claim 10, wherein the first configuration is an EPDCCH search space configuration signaling to configure the user equipment, the EPDCCH search space configuration including the designation of the one or more subframes.

12. The non-transitory computer-readable medium of claim 10, wherein the narrowband bandwidth is an EPDCCH bandwidth and the system bandwidth is a wideband bandwidth.

13. The non-transitory computer-readable medium claim 10, wherein the probe message includes at least one of:
(a) a time command indicating to the user equipment when to switch to the system bandwidth,
(b) a bandwidth indicator indicating a bandwidth for the user equipment to monitor between the narrowband bandwidth and the system bandwidth, and
(c) duration information indicating to the user equipment when to switch from monitoring the system bandwidth to the narrowband bandwidth.

14. The non-transitory computer-readable medium of claim 13, wherein the probe message is one of a dedicated radio resource control (RRC) signaling, common RRC signaling and physical layer message.

15. The non-transitory computer-readable medium of claim 10, wherein the probe message is a downlink control information (DCI) message and includes one of:
(a) a group command, with the user equipment having an index i in the group, where the user equipment receives the probe message in the $i^{th}$ bit in a bitmap included in the DCI,
(b) a cyclic redundancy check (CRC) scrambled with a cell radio network temporary Identifier (C-RNTI) having a bit indicating to the user equipment to switch from one of the narrowband bandwidth to the system bandwidth and the system bandwidth to the narrowband bandwidth, a time stamp and a duration to of time to monitor the system bandwidth, and
(c) a cyclic redundancy check (CRC) scrambled with a group radio network temporary Identifier (G-RNTI) each having a bit indicating to a respective user equipment to switch from one of the narrowband bandwidth to the system bandwidth and the system bandwidth to the narrowband bandwidth, a time stamp and a duration to of time to monitor the system bandwidth.

16. The non-transitory computer-readable medium of claim 10, wherein
the first configuration signaling indicates a semi-persistent scheduling of the one or more subframes delivered by the base station, and
the probe message includes a new data indicator field that is set to a first value to indicate the narrowband bandwidth monitoring by the user equipment and is set to a second value to indicate the system bandwidth monitoring by the user equipment.

17. The non-transitory computer-readable medium of claim 10, wherein the one or more subframes are divided into a first zone including the narrowband bandwidth and the system bandwidth, and a second zone including the system bandwidth,
the instructions when executed by the one or more processors, perform the further steps of:
the base station sends a second configuration signaling to configure the user equipment as a member of one of a first and second set, where the members of the first set are configured to monitor the system bandwidth and the members of the second set are configured to monitor the narrowband bandwidth.

18. The non-transitory computer-readable medium of claim 17, the instructions when executed by the one or more processors, perform the further steps of:
the base station determining whether to send an assignment to the user equipment;

in response to the base station sending the assignment and determining the user equipment is a member of the first set,
   allocating resources in one or more of the first zone and the second zone of the one or more subframes, and
   sending the assignment including the allocation of resources in the first zone to the user equipment; and
in response to the base station sending the assignment and determining the user equipment is a member of the second set,
   allocating resources in the second zone of the one or more subframes, and
   sending the assignment as the probe message, including the allocation of resources, in the second zone to the user equipment.

19. A base station to signal user equipment to monitor a narrowband control channel in a wideband system for supporting multiple protocols in a network, comprising:
   a memory storage comprising instructions; and
   one or more processors coupled to the memory that execute the instructions to:
   send a first configuration signaling from the base station to configure the user equipment including a designation of one or more subframes;
      determine by the base station whether to signal the user equipment to monitor the one or more subframes using one of a narrowband bandwidth and a system bandwidth;
      in response to the base station signaling the user equipment to monitor the narrowband bandwidth, communicate with the user equipment using the narrowband bandwidth; and
      in response to the base station signaling the user equipment to monitor the system bandwidth,
   send a probe message within the narrowband bandwidth to the user equipment, the probe message signaling to the user equipment to begin monitoring the system bandwidth, and
communicate with the user equipment using the system bandwidth.

20. The base station claim 19, wherein the probe message includes at least one of:
   (a) a time command indicating to the user equipment when to switch to the system bandwidth,
   (b) a bandwidth indicator indicating a bandwidth for the user equipment to monitor between the narrowband bandwidth and the system bandwidth, and
   (c) duration information indicating to the user equipment when to switch from monitoring the system bandwidth to the narrowband bandwidth.

21. The base station of claim 19, wherein the probe message is a downlink control information (DCI) message and includes one of:
   (a) a group command, with the user equipment having an index i in the group, where the user equipment receives the probe message in the $i^{th}$ bit in a bitmap included in the DCI,
   (b) a cyclic redundancy check (CRC) scrambled with a cell radio network temporary Identifier (C-RNTI) having a bit indicating to the user equipment to switch from one of the narrowband bandwidth to the system bandwidth and the system bandwidth to the narrowband bandwidth, a time stamp and a duration to of time to monitor the system bandwidth, and
   (c) a cyclic redundancy check (CRC) scrambled with a group radio network temporary Identifier (G-RNTI) each having a bit indicating to a respective user equipment to switch from one of the narrowband bandwidth to the system bandwidth and the system bandwidth to the narrowband bandwidth, a time stamp and a duration to of time to monitor the system bandwidth.

* * * * *